Figure 1:
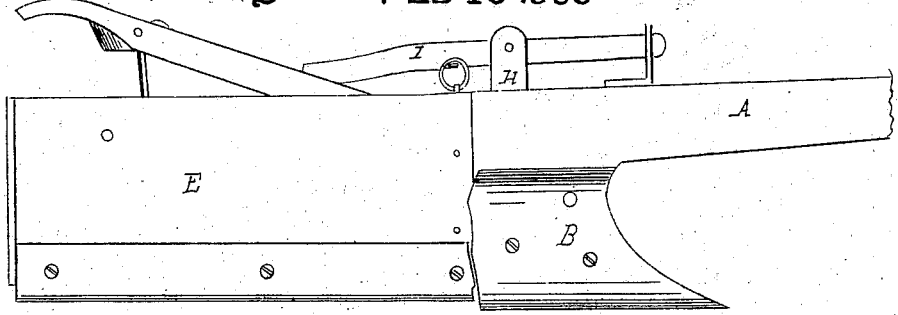
Figure 2:
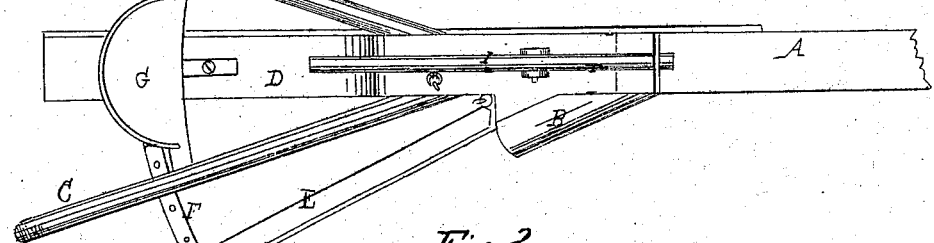
Figure 3:
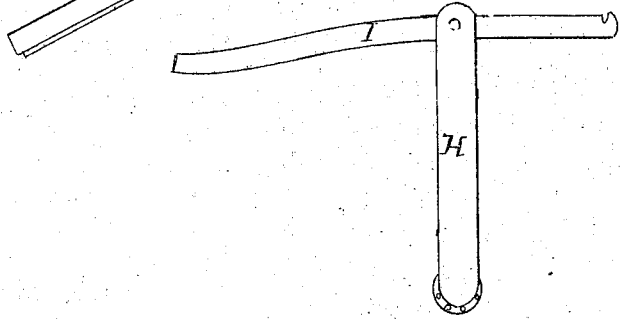

S. W. Standart's Plow.

No. 74729 — PATENTED FEB 18 1868

Witnesses:

Inventor:
S. W. Standard
per
Alexander &...

United States Patent Office.

STEPHEN W. STANDART, OF BELLEVUE, OHIO.

Letters Patent No. 74,729, dated February 18, 1868.

IMPROVEMENT IN PLOUGHS.

*The Schedule referred to in these Letters Patent and making part of the same.*

TO ALL WHOM IT MAY CONCERN:

Be it known that I, S. W. STANDART, of Bellevue, in the county of Huron, and in the State of Ohio, have invented certain new and useful Improvements in Ploughs; and do hereby declare that the following is a full, clear, and exact description thereof, reference being had to the accompanying drawings, and to the letters of reference marked thereon.

In the annexed drawings, making part of this specification, A represents the beam of the plough, which has its rear end curved downward, back of the point where the handles C C join to it, and secured in the land-side bar D. B represents the mould-board, which may be made in any of the known and usual ways. Back of this stationary mould-board is a movable mould-board, E, having its forward end hinged in rear of the stationary one, so as to form a prolongation of it. The outer end of this movable mould-board is regulated and adjusted by means of two graduated bars, F, which connect its rear end to the land-side bar D. This mould-board may sometimes be eight feet in length, and more or less, if required. H represents a vertical bar, which passes down through an opening in the beam, and in rear of the stationary mould-board, and has a wheel on its lower end, which runs in the direction in which the plough moves. This bar is raised and lowered by means of a lever, I. D represents a wooden bar, which passes along back with the land-side several feet in rear of the plough-point, and upon it is erected a standard, upon which is placed and secured a driver's seat.

This plough is used more particularly for grading and making roads and cleaning and opening ditches. The movable mould-board may be set out from the land-side, at its rear, as far as desirable, and so that the earth ploughed up may be scraped three or four feet, or more, away from the furrow and into the road. The roller on the lower end of the bar H is used for regulating the depth to which the plough shall enter the earth. This plough may be used as a leveller and scraper at the same time.

Having thus fully described my invention, what I claim as new, and desire to secure by Letters Patent, is—

The arrangement of the land-side bar D, movable mould-board E, provided with metal knife at its bottom, bars F, bar H, and roller, operated by the lever I, the whole combined and used with the plough-beam, in the manner and for the purpose set forth.

In testimony that I claim the foregoing, I have hereunto set my hand, this 15th day of July, 1867.

STEPHEN W. STANDART.

Witnesses:
HIRAM PECK,
B. P. SMITH.